(12) United States Patent
Ho et al.

(10) Patent No.: US 8,098,599 B2
(45) Date of Patent: Jan. 17, 2012

(54) METHOD AND SYSTEM FOR MULTIPLE PARTY TELEPHONE CALL

(75) Inventors: Chi Fai Ho, Palo Alto, CA (US); Shin Cheung Simon Chiu, Palo Alto, CA (US)

(73) Assignee: TP Lab Inc., Palo Alto, CA (US)

( * ) Notice: Subject to any disclaimer, the term of this patent is extended or adjusted under 35 U.S.C. 154(b) by 676 days.

(21) Appl. No.: 11/353,696

(22) Filed: Feb. 13, 2006

(65) Prior Publication Data

US 2007/0189269 A1    Aug. 16, 2007

(51) Int. Cl.
*H04L 12/16* (2006.01)
(52) U.S. Cl. ....................................................... 370/260
(58) Field of Classification Search .......... 370/351–356, 370/401–402, 259–271
See application file for complete search history.

(56) References Cited

U.S. PATENT DOCUMENTS

| | | | | |
|---|---|---|---|---|
| 5,384,622 A * | 1/1995 | Hirata et al. ...................... 399/8 |
| 5,495,522 A * | 2/1996 | Allen et al. ............... 379/202.01 |
| 5,812,642 A * | 9/1998 | Leroy ........................ 379/92.01 |
| 6,404,745 B1 * | 6/2002 | O'Neil et al. .................. 370/260 |
| 6,434,394 B1 * | 8/2002 | Grundvig et al. ............. 455/463 |
| 6,510,152 B1 * | 1/2003 | Gerszberg et al. ............. 370/352 |
| 6,687,234 B1 * | 2/2004 | Shaffer et al. ................. 370/260 |
| 6,731,744 B1 * | 5/2004 | Khuc et al. ............... 379/265.01 |
| 6,785,246 B2 * | 8/2004 | Foti ............................... 370/261 |
| 7,028,228 B1 * | 4/2006 | Lovy et al. ....................... 714/57 |
| 7,043,004 B1 * | 5/2006 | Khuc et al. ............... 379/265.01 |
| 7,072,675 B1 * | 7/2006 | Kanakubo ..................... 455/462 |
| 7,146,180 B1 * | 12/2006 | Liu ................................ 455/465 |
| 7,269,162 B1 * | 9/2007 | Turner .......................... 370/352 |
| 7,426,193 B2 * | 9/2008 | Roher et al. ................... 370/261 |
| 7,830,792 B1 * | 11/2010 | Khuc et al. .................... 370/230 |
| 2001/0054070 A1 * | 12/2001 | Savage et al. ................. 709/204 |
| 2003/0187940 A1 * | 10/2003 | Ludwig et al. ................ 709/206 |
| 2004/0132489 A1 * | 7/2004 | Ryley et al. ................. 455/556.1 |
| 2004/0141605 A1 * | 7/2004 | Chen et al. ................ 379/202.01 |
| 2004/0170264 A1 * | 9/2004 | Benco et al. .............. 379/202.01 |
| 2004/0242244 A1 * | 12/2004 | Liu ................................ 455/462 |
| 2005/0007965 A1 * | 1/2005 | Hagen et al. .................. 370/260 |
| 2005/0226404 A1 * | 10/2005 | Bolotnikov ............... 379/428.02 |
| 2006/0008065 A1 * | 1/2006 | Longman et al. ............. 379/158 |
| 2006/0030357 A1 * | 2/2006 | McConnell et al. ........ 455/554.1 |

* cited by examiner

*Primary Examiner* — Ayaz Sheikh
*Assistant Examiner* — Faiyazkhan Ghafoerkhan
(74) *Attorney, Agent, or Firm* — Timothy X. Gibson Esq.; Gibson & Dernier, LLP

(57) ABSTRACT

Provided is a method and system for multiple party telephone calls. The method includes receiving an incoming voice telephone call from a call network at a multi-party module, and allowing, by the multi-party module, for a plurality of terminal modules to participate in the incoming voice telephone call, each terminal module comprising a telephone.

22 Claims, 8 Drawing Sheets

METHOD AND SYSTEM FOR MULTIPLE PARTY TELEPHONE CALL

BACKGROUND OF THE INVENTION

The multi-party line is a time honored voice communication feature that allows users using multiple terminals to participate in a telephone call. It was widely deployed as a public telephone service when cost of telephone equipment and telephone lines was high.

Multi-party lines have been employed in key systems for small businesses, and in hotel or motel guest rooms. The deployment of cordless telephony based on wireless technologies such as Digital Enhanced Cordless Telecommunication ("DECT") and Communication Technologies 2 ("CT2") has fueled the continued use of multi-party lines.

With the advancement of Internet technologies, Internet Protocol ("IP") networks are becoming an important means for voice and data communications. Internet service providers and equipment vendors roll out successful voice communication services and products at a breathtaking pace. Many of these services and products are based on various Voice over IP ("VoIP") technologies, such as H.323 and Session Initiation Protocol ("SIP"). However, these VoIP technologies, limited by their reliance on endpoint call state management and their lack of a centralized call processing architecture, are inherently unsuitable for supporting multi-party lines. The lack of a centralized call processing architecture is problematic for supporting multi-party calls because the control of each individual telephone call is concentrated at the call's origination and destination, and once the call is established, an additional party has no centralized call processing entity to request that they be joined to the existing telephone call from. Thus, in attempting to join the existing telephone call in such an endpoint state management system, the additional party will only get a busy signal. The following examples are illustrative of various limitations VoIP technologies have with respect to multi-party lines.

In one example, a caller calls a multi-party line by alerting the multiple telephone terminals of the multi-party line. In a non-VoIP environment, when a first terminal answers the call, the centralized call processing center then removes the call alert from the other telephone terminals and establishes the multi-party call. In the case of a VoIP call, when a first terminal of the multi-party line answers the call, since there is no centralized call processing center, there is no feasible method to notify the other telephone terminals of the multi-party line to remove the call alert, thus the multi-party line call cannot be established.

In another example, a first terminal is conducting a conversation over a VoIP call. When a second terminal of the multi-party line desires to join the call, there is no feasible method to allow the second terminal to join the conversation. For example, if the second terminal attempts to call the first terminal, it receives a busy signal. Under systems using a centralized call processing center, the center is able to verify the second terminal as authorized on the multiple-party line call, and allow them to join in the already-initiated call.

In another example, a first user subscribes to a single-line residential telephone service. The first user connects the base station of her old 2.4 GHz multi-handset to the telephone line, with one handset in the kitchen, and the other handset in her daughter's bedroom. With this set up, the first user and her daughter are able to participate in a telephone call using the two handsets. Impressed with the low cost and the promise of convenience and other advanced features, the first user decides to switch to a 2-line residential VoIP telephone service. Bundled with the service are two brand new VoIP telephones. Each VoIP telephone includes an independent VoIP application, allowing the first user and her daughter to make separate telephone calls at the same time. While enjoying the new found convenience, the first user is unaware of the limitation that the multi-party line feature no longer works. While conducting a conversation with second user, such as a relative, over the VoIP telephone in the kitchen, the first user wants her daughter to join the conversation using the VoIP telephone in her room. When the daughter picks up her phone, she is unable to join the conversation, since there is now no centralized call processor. Instead she receives a dial tone, prompting her to make a new call.

In still another example, a user owns a small business and subscribes to a single-line business telephone service. The user uses a telephone connector to connect two telephones to the telephone line. With this set up, the user can monitor the way his employee handles customer calls, and at time can join the conversation when necessary. With the expansion of his business, the user hires two new employees and switches to a 4-line VoIP business telephone service. With the new setup, the user and his employees can simultaneously handle multiple customer calls. However, the user can no longer monitor his employees' performance, and offer his help.

In another example, a hotel has upgraded its guest rooms to use VoIP technology. Each telephone runs a separate VoIP application, and each connects to the hotel's IP-Public Branch Exchange (IP-PBX) to receive telephone service. A user is a frequent patron of the hotel. Before the upgrade, she was able to use any telephone in the guest room to engage in a call. Unaware of the recent upgrade, she checks into the hotel the night before an important strategic presentation to her customers. She checks into an executive suite that features multiple VoIP telephones, one at the night stand in the bedroom, one on a desk in the adjacent living quarter, and one in the bathroom. At two o'clock a.m., the telephone rings. She wakes up and picks up the call with the VoIP telephone at the night stand and speaks to her boss regarding critical changes in the customer presentation. After talking for a minute, she decides to move to the living quarter in order to review the presentation in her laptop while expecting to resume the conversion with her boss with the VoIP telephone at the desk. But when she picks up the VoIP telephone, she is unable to speak to or hear from her boss, because there is no centralized call processor tying the telephone lines in the room together into a multi-party line.

The foregoing examples demonstrate the need to provide multi-party line features over an IP network.

SUMMARY OF THE INVENTION

An aspect of the present invention provides a multiple party telephone call method. The method includes receiving an incoming voice telephone call at a multi-party module, and allowing, by the multi-party module, for a plurality of terminal modules to participate in the incoming voice telephone call. Each terminal module is associated with a telephonic end-user device, such as a telephone handset, a video telephone, or a facsimile machine.

In another aspect of the invention, the voice telephone call in the above method is a Plain Old Telephone Service ("POTS") telephone call.

In another aspect of the invention, the voice telephone call in the above method is a cellular telephone call.

In another aspect of the invention, the voice telephone call in the above method is a VoIP telephone call.

In another aspect of the invention, the voice telephone call in the above method is offered by an Instant Messaging ("IM") service.

In another aspect of the invention, the voice telephone call in the above method is offered by a Private Branch Exchange ("PBX").

In another aspect of the invention, the voice telephone call in the above method is offered by an Internet Protocol Private Branch Exchange ("IP-PBX").

In another aspect of the invention, the method further includes incrementing a zero-initialized counter each time a terminal module begins participation in the voice telephone call.

Another aspect of the invention includes the above method, further decrementing the counter each time a terminal module ends participation in the voice telephone call, and terminating the voice telephone call by the multi-party module when the counter returns to zero.

In another aspect of the invention, the multi-party module may terminate the incoming voice telephone call.

Another aspect of the present invention provides a multiple party telephone call system. The system includes a multi-party module in communication with a call interface, such as a call network, and also in communication with a plurality of terminal modules, each terminal module comprising a telephone, and the multi-party module comprising a processor and associated memory. The processor and memory are configured to receive an incoming voice telephone call from the call network at the multi-party module, and allow for a plurality of terminal modules to participate in the incoming voice telephone call.

Another aspect of the invention includes the system above, in which the processor and associated memory of the multi-party module are further configured to increment a zero-initialized counter when a terminal module begins participation in a voice telephone call, and to decrement the counter when a terminal module ends participation in a telephone call.

In another aspect of the invention, the processor and associated memory of the multi-party module are further configured to disconnect the voice telephone call when the counter returns to zero.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

Figure 1:
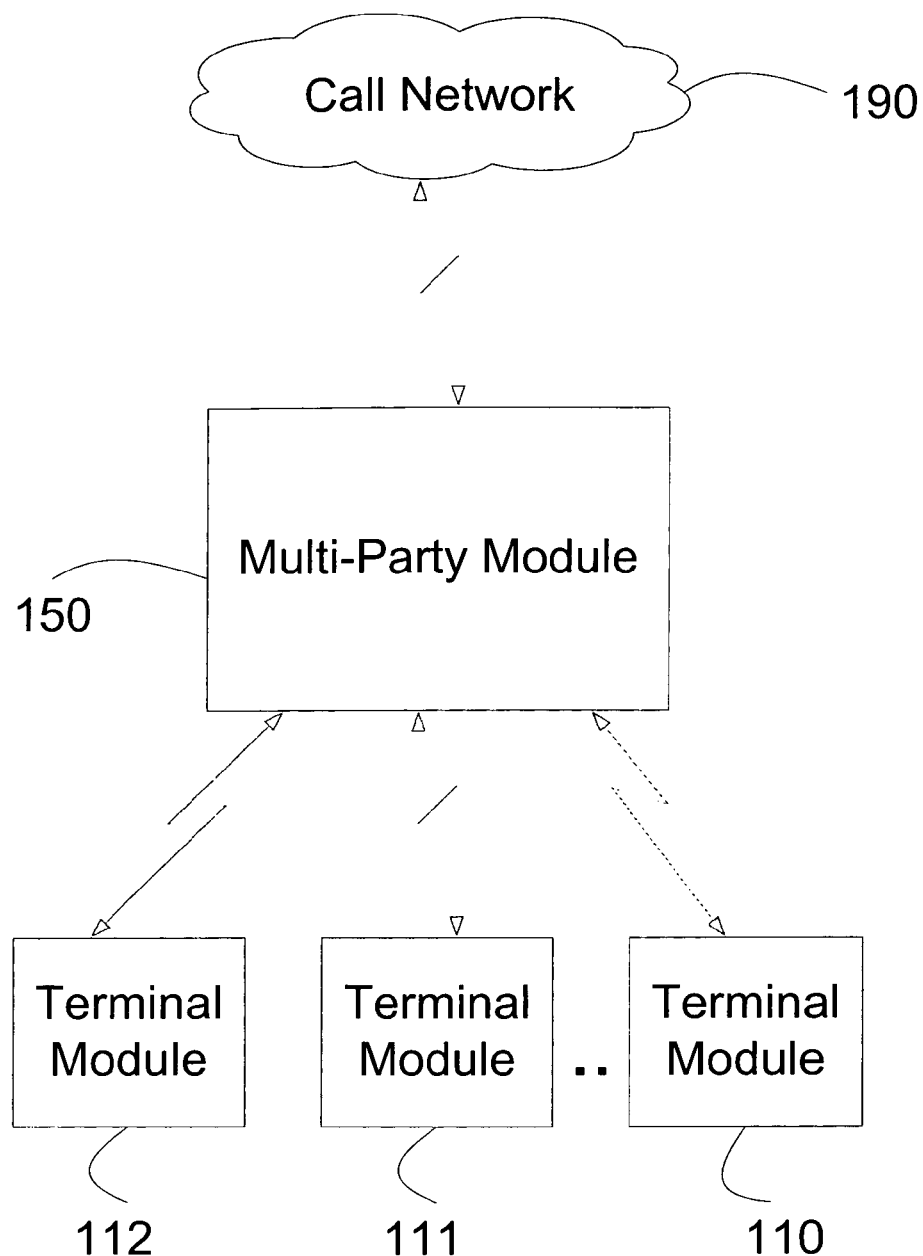
FIG. 1 is a schematic diagram illustrating a multi-party module communicating to a call network and a plurality of terminal modules, in accordance with an embodiment of the invention.

FIG. 1 schematically illustrates a multi-party module 150 communicating to a call network 190 and a plurality of terminal modules 110, 111, 112, in accordance with an embodiment of the invention. The plurality of terminal modules 110, 111, and 112, as used in the foregoing description of embodiments of the invention, are also intended to include the cases of either a single, only two, or more than three terminal modules, where appropriate in context.

In an embodiment of the invention, a multi-party call system includes a call network 190, which includes a network that supports a call such as but not limited to a voice telephone call. A multi-party module 150 communicates with the call network 190, and with one or more terminal modules 110, 111, 112 with which it is connected. Terminal modules 110, 111, 112 each are in turn interfaced to a telephone end-user device, such as a handset or speakerphone (not depicted). Terminal modules 110, 111, 112 and multi-party module 150 each include a microprocessor and associated memory configured to perform the methods described herein. For example, the multi-party module 150 and terminal modules 110, 111, 112 may each be personal computers in communication with each other via a network connection, and the multi-party module may also communicate with the call network 190 over a network, such as but not limited to the Internet. In other examples, the terminal modules 110, 111, 112 can each be a customized stand-alone unit having the requisite processor, memory and programming to perform the methods required of terminal modules, or the terminal modules may be integrated with telephone end-user device, such as but not limited to telephone handsets. Likewise, the multi-party module 150 can be a stand-alone unit or integrated with another unit which provides access to the call network 190 and terminal modules 110, 111, 112.

While it is preferred in an embodiment for the multi-party module 150 to be co-located with the group of terminal modules 110, 111, 112 with which it is in communication, this is not required. The multi-party module 150, and even the terminal modules 110, 111, 112 themselves, can be located in a different physical location from their connected end-user devices and from each other, although co-location does provide certain advantages well known to those of ordinary skill in electronics, such as, but not limited to, reduced signal degradation with shorter communication pathways. It is preferable to use a chipset that supports multi-mode voice applications, for example, a chipset that includes Global System for Mobile Communications ("GSM") and Voice over Wi-Fi ("VoWi-Fi") capability, such as Intel's PXA™ chipset; or a chipset that supports Voice over IP and cellular applications, such as those based on Texas Instrument's Wireless Any-Network Digital Assistant ("WANDA") architecture.

The call network 190 can include but is not limited to a public switched telephone network ("PSTN"), a cellular network, a corporate telephone network, an Internet Protocol ("IP") network, the Internet, a corporate Virtual Private Network ("VPN"), a Voice over IP ("VOIP") network, or any combination of these.

In an embodiment, multi-party module 150 functions to process a voice telephone call between the multi-party module 150 and call network 190. The voice telephone call can be a Plain Old Telephone Service ("POTS") telephone call offered by a residential telephone service provider, a cellular telephone call offered by a mobile telephone service provider, a VOIP call offered by an Internet telephony service provider, such as Vonage, or Skype, a call offered by an Instant Messaging ("IM") service, such as Yahoo Messenger, MSN Messenger, AOL AIM or GoogleTalk service, a call offered by a Private Branch Exchange ("PBX"), an Internet Protocol Private Branch Exchange ("IP-PBX"), or a softphone call.

A softphone is software that simulates a telephone and runs on a general purpose computer. Typically, a softphone supports VoIP communications. Examples of a softphone are CounterPath's eyeBeam™, Pingtel's sipXphone™ and Nortel's i2050 Software Phone™.

Examples of the multi-party module 150 processing a voice telephone call include the multi-party module 150 receiving an incoming voice telephone call from the call network 190, making an outgoing voice telephone call to the call network 190, disconnecting an incoming voice telephone call, or disconnecting an outgoing voice telephone call. The multi-party module 150 can process a voice telephone call by sending call signals to, and receiving call signals from the call network 190. These call signals together represent the actual voice telephone call itself, usually in a compressed format, plus any information needed at the terminal end-user devices to restore the voice telephone call to its original acoustic sound.

Call signals used by the invention can be based on a standard protocol or an extension of a standard protocol, such as POTS protocol, Global System for Mobile Communications ("GSM") protocol, Session Initiation Protocol ("SIP"), H.323 protocol, Megaco protocol, a SIP extension protocol, an H.323 extension protocol, a Session Initiation Protocol for Instant Messaging and Presence Leveraging Extensions ("SIMPLE") based protocol, an Extensible Message and Presence ("XMPP") based protocol, or may be based on a proprietary protocol, such as Skype protocol, or a protocol used in a PBX or a key system.

Communication between the multi-party module 150 and the terminal modules 110, 111, 112 can be over a packet data network. The packet network can be an IP network, and may include the Internet, or a corporate VPN, or a wired IP network, such as an Ethernet Network, or a wireless IP network, such as a Wireless Fidelity ("WiFi") network, or a Bluetooth network, or a hotspot wireless network.

The multi-party module 150 includes the functionality of allowing the terminal modules 110, 111, 112 to participate in a voice telephone call that is already present between the multi-party module 150 and the call network 190. This functionality may be provided in several ways. For example, once a voice telephone call is present between the multi-party module 150 and the call network 190, the multi-party module can send a signal to the terminal modules 110, 111, 112 indicating there is a call in progress. In turn, one or more of the terminal modules may cause their associated telephone end-user device, such as a handset (not depicted), to signal an end user that the call is in progress. In response, the end user may next use their telephone end-user device to attempt to join the voice telephone call, and the telephone end-user device can then communicate with its associated terminal module 110, which, in turn, may send a terminal signal to the multi-party module 150, which may then allow the user to join the voice telephone call in progress.

In another embodiment, a terminal module 110, 111, 112 can be associated with other telephone end-user devices, such as, but not limited to fax machines, answering machines, cordless handsets or personal computers.

In a preferred embodiment, the multi-party module 150 mediates the voice signals from the call network 190 and from the terminal modules 110, 111, 112. The voice signals from the call network 190 represent the voice of a remote user of the voice telephone call. The voice signals from terminal modules 110, 111, 112 represent the voice of a user using the telephone end-user devices associated with their respective terminal modules 110, 111, 112. For example, the multi-party module 150 can combine the voice signals from the terminal modules 110, 111, 112 and send the combined voice signals to the call network 190. In another example, the multi-party module 150 sends the voice signals from the call network 190 to the each of the connected terminal modules 110, 111, 112.

As previously mentioned, the multi-party module 150 may convert voice signals to a standard codec format before sending them to either the call network 190 or to connected terminal modules 110, 111, 112. For example, in one embodiment, the multi-party module can transmit and receive voice signals over a packet data network, such as an IP network, to connected terminal modules 110, 111, 112. In other embodiments, the voice signals can be sent in Real-time Transport Protocol ("RTP") packets, or may be represented by a speech codec, such as G.711, G.723.1 and G.729, or may be represented by a wide bandwidth codec that encodes high fidelity voice signals, such as Moving Picture Experts Group Layer 3 ("MP3") or Windows Media Audio ("WMA"), or by a wide bandwidth codec that encodes multiple channels of high fidelity voice signals. In another embodiment, the multi-party module 150 may transmit and receive voice signals over a second network, such as, but not limited to, a network based on CT2 or DECT technology.

The multi-party module 150 can connect to one or more terminal modules 110, 111, 112 in order to allow the users of the telephone end-user device associated with each of the terminal modules 110, 111, 112 to participate in a voice telephone call. The multi-party module 150 can communicate with one or more terminal modules 110, 111, 112 by establishing a communication session between the multi-party module 150 and each of the connected terminal modules 110, 111, 112. For example, the communication session may include a TCP session between the multi-party module 150 and the connected terminal modules 110, 111, 112. Such a communication session may be initiated by either the terminal modules 110, 111, 112 or the multi-party module 150. In another example, the communication session includes an UDP session between multi-party module 150 and each of the connected terminal modules 110, 111, 112, which may be initiated by either the multi-party module 150 or the connected terminal modules 110, 111, 112.

In an exemplary embodiment of the invention, the multi-party module 150 receives a request from one or more of the terminal modules 110, 111, 112 to register for participation in an ongoing voice telephone call. The request may include the IP address of the one or more terminal modules 110, 111, 112, as well as information relating to the terminal module's voice telephone call participation capabilities, such as supported media codecs, authentication credentials or security keys, etc.

After multi-party module 150 processes the request, the multi-party module 150 may then connect to the one or more terminal modules 110, 111, 112. This connection, as previously described, may entail the establishment of a communication session with the terminal modules 110, 111, 112, in which the multi-party module 150 can send signals to, and receives signals from the connected terminal modules 110, 111, 112 in subsequent communication for voice telephone call participation.

For example, in an embodiment, the communication session can include an IP multicast session between the multi-party module 150 and the connected terminal modules 110, 111, 112, in which the multi-party module 150 may include a multicast IP address, and the multi-party module 150 may associate the IP address of each of the terminal modules 110, 111, 112 with this multicast IP address.

Figure 2:
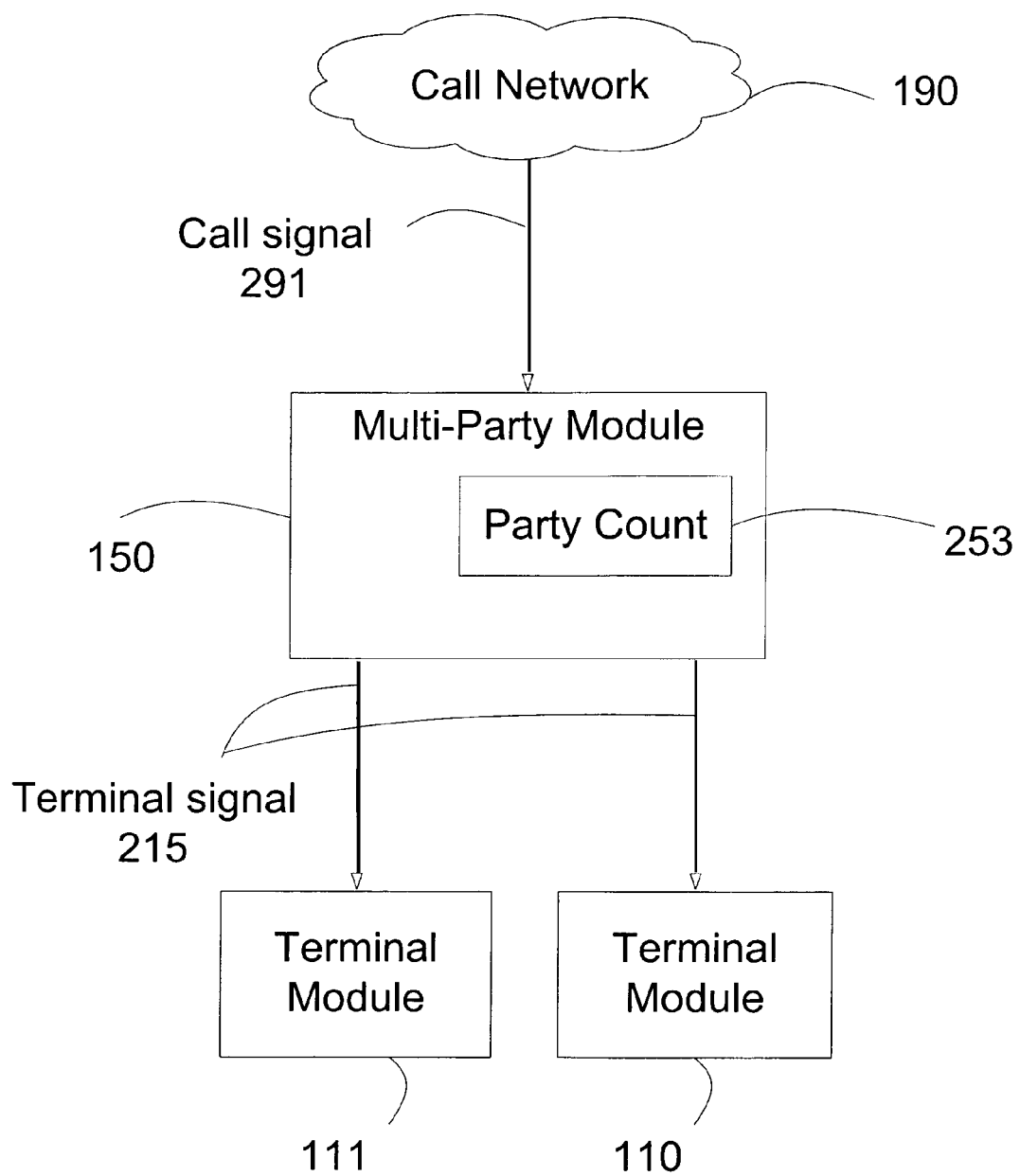
FIG. 2 is a schematic diagram illustrating the processing of an incoming voice telephone call by an exemplary multi-party module.

FIG. 2 is an exemplary illustration of processing an incoming voice telephone call, represented by the call signal 291, by a multi-party module 150. The multi-party module 150 connects to the terminal modules 110, 111, and also maintains an internal counter, party count 253, indicating the number of terminal modules 110, 111 that are participating in the incoming voice telephone call. When the multi-party module 150 receives the call signal 291 from the call network 190 indicating the arrival of the incoming voice telephone call, the multi-party module 150 sets its party count 253 to "0". Preferably, the multi-party module 150 then composes a terminal signal 215 for alerting for the terminal modules 110, 111 of the incoming voice telephone call. The multi-party module 150 then sends the terminal signal 215 to the terminal modules 110 and 111. The terminal signal 215 may also include an instruction for the terminal modules 110, 111 to generate an alerting signal, such as a ring tone, to their associated telephone end-user device (not depicted).

Figure 3:
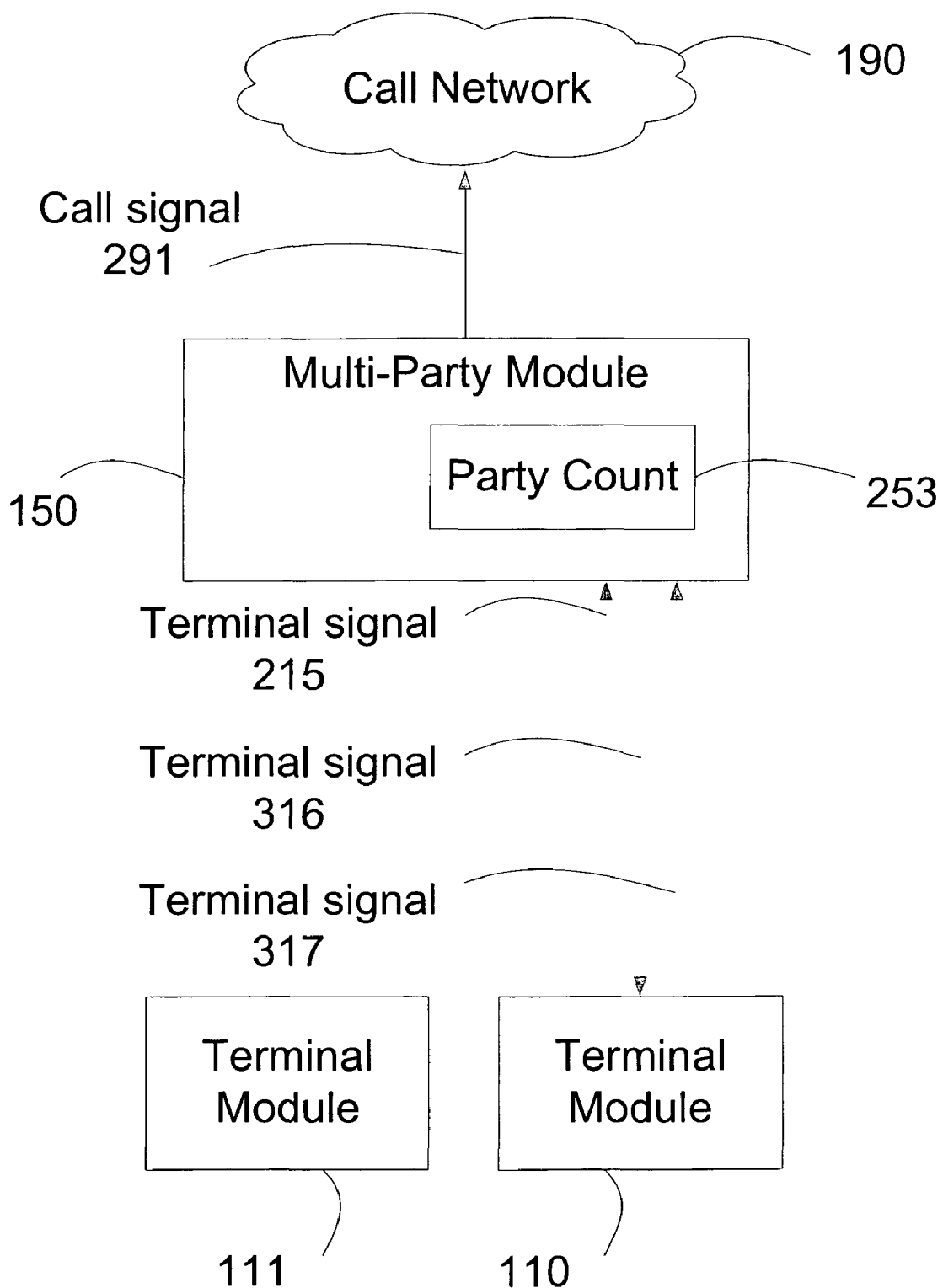
FIG. 3 is a schematic diagram illustrating the processing of an outgoing voice telephone call by the multi-party module in accordance with an embodiment of the invention.

FIG. 3 illustrates the processing of an outgoing voice telephone call by the multi-party module 150 in accordance with an embodiment of the invention. The multi-party module 150 is connected to terminal modules 110 and 111, as described above. As previously described, the multi-party module 150 can include a counter, party count 253, to track the number of terminal modules 110, 111 that are involved in the outgoing voice telephone call. For example, prior to the outgoing voice telephone call being present, the multi-party module's party count 253 has an initial value of "0".

In an embodiment, in order to establish the outgoing voice telephone call, the multi-party module 150 receives a terminal signal 215 from terminal module 110, indicating a request to start a voice telephone call. Next, the multi-party module 150 sets Party Count 253 to "1", composes a terminal signal 316 for indicating the readiness for initiating an outgoing voice telephone call, and sends the terminal signal 316 to terminal module 110. The terminal signal 316 may include an instruction for the terminal module 110 to generate a dial tone to its associated telephone end-user device (not depicted). Next, the multi-party module 150 receives from terminal module 110 a terminal signal 317, which preferably includes calling information necessary for establishing the telephone call, such as a telephone number. In various other embodiments, the calling information may include a name or a Universal Resource Identifier ("URI"). Next, multi-party module 150 composes a call signal 291 for initiation of an outgoing voice telephone call based on the calling information, and sends the call signal 291 to the call network 190 to initiate the outgoing voice telephone call.

Figure 4:
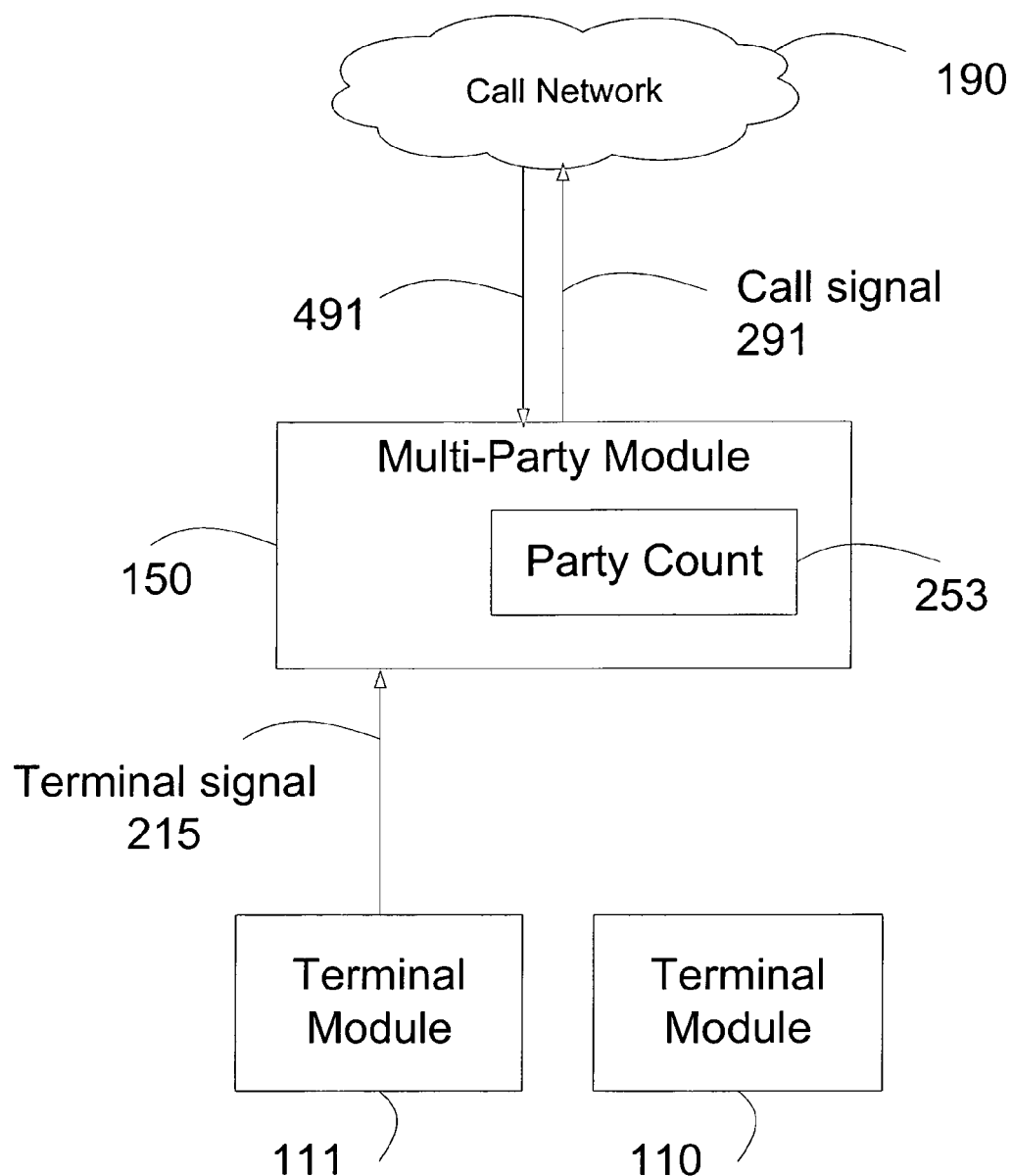
FIG. 4 is a schematic diagram illustrating a process for a terminal module to join an ongoing voice telephone call in accordance with an embodiment of the invention.

FIG. 4 illustrates a process for a terminal module 111 to join an ongoing voice telephone call in accordance with an embodiment of the invention. The multi-party module 150 is connected with terminal modules 110 and 111 in a manner such as described above, and an ongoing voice telephone call (not depicted) is present between the call network 190 and the multi-party module 150, after multi-party module 150 receives a call signal 491 indicating the arrival of an incoming voice telephone call. The ongoing voice telephone call may alternatively be initiated after the multi-party module 150 initiates it. In either case, the multi-party module can maintain a counter indicating the number of terminal modules participating in the voice telephone call, party count 253, which is initialized to Next, in an embodiment, the multi-party module 150 receives from a terminal module 111 a terminal signal 215 indicating a request to join the voice telephone call, and, in response, the multi-party module 150 can increase the party count 253 by "1".

In another embodiment, the ongoing voice telephone call is an incoming voice telephone call that has not yet been answered, and multi-party module 150 composes a call signal 291 for answering the incoming voice telephone call, and sends the call signal 291 to the call network 190 to answer the incoming voice telephone call.

Figure 5:
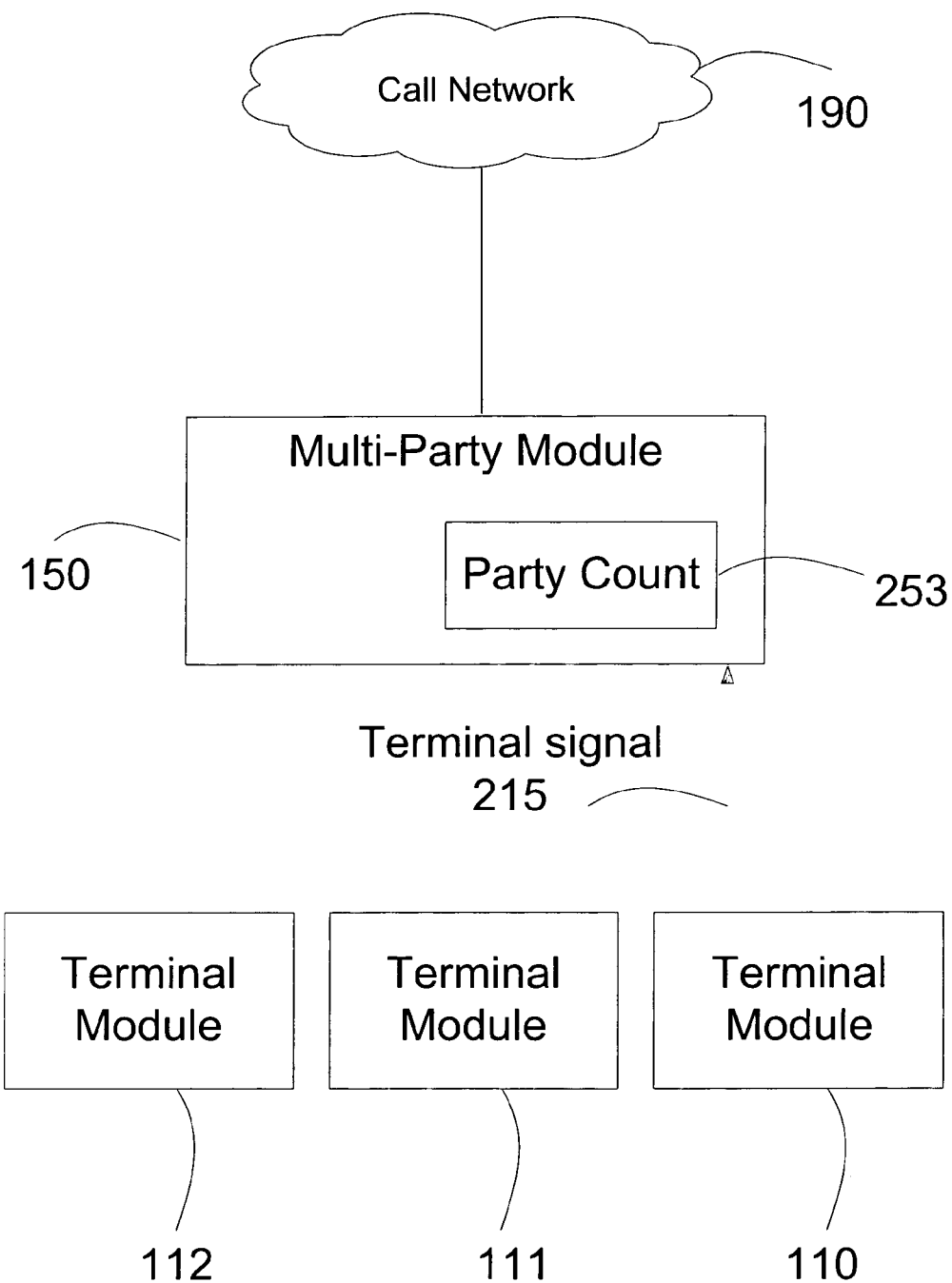
FIG. 5 is a schematic diagram illustrating a process for a terminal module to leave an ongoing voice telephone call, in accordance with an embodiment of the invention.

FIG. 5 illustrates a process for a terminal module 110 to leave an ongoing voice telephone call, in accordance with an embodiment of the invention. Multi-party module 150 is connected to one or more terminal modules 110, 111, 112, and an ongoing voice telephone call is present between the call network 190 and the multi-party module 150. In an exemplary embodiment, terminal module 110 and 111 are involved in the ongoing voice telephone call, and the multi-party module has set its party count 253 to a value of "2". Next, the multi-party module 150 receives a terminal signal 215 from terminal module 110 indicating that user of the telephone end-user device associated with terminal module 110 wants to leave the voice telephone call. In response, multi-party module 150 decreases party count 253 by 1, leaving party count 253 with an after-decrease value of "1".

Figure 6:
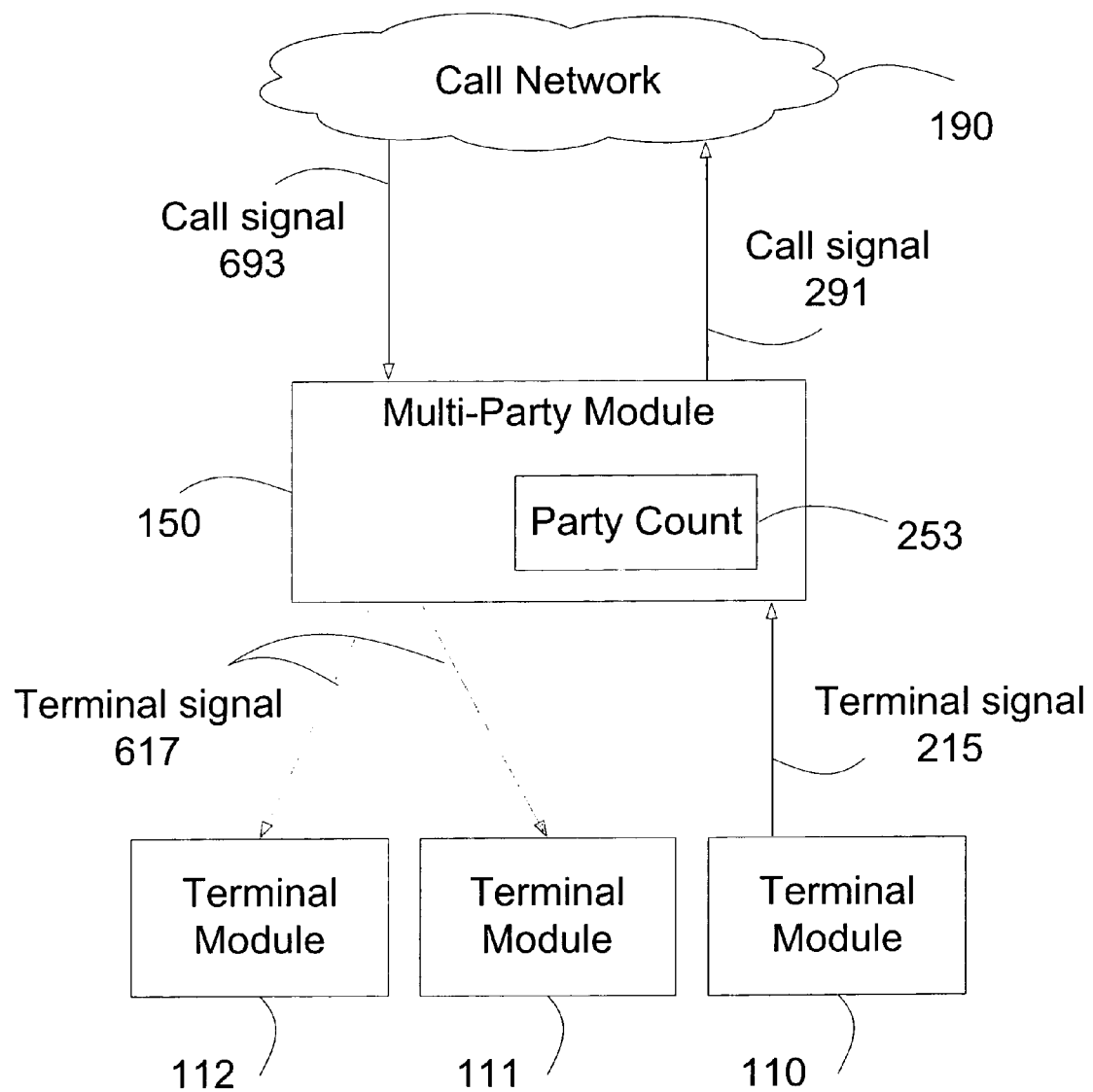
FIG. 6 is a schematic diagram illustrating a process for a terminal module to leave an ongoing voice telephone call, in accordance with an embodiment of the invention.

FIG. 6 illustrates a process whereby an ongoing voice telephone call is terminated by the leaving of a terminal module 110 from participating in the call, in accordance with an embodiment of the invention. The multi-party module 150 is connected to terminal modules 110, 111 and 112, and terminal module 110 is involved in an ongoing voice telephone call. The multi-party module 150 thus has set its party count 253 to a value of "1". Next, the multi-party module 150 receives from terminal module 110 a terminal signal 215 indicating a request to leave the voice telephone call. The multi-party module 150 decreases party count 253 by 1, leaving its party count 253 with an after decrease value of "0", indicating that no terminal modules are involved in the ongoing voice telephone call. In an embodiment, the multi-party module 150 then composes a call signal 291 for disconnecting the voice telephone call, and sends it to the call network 190 to disconnect the ongoing voice telephone call.

In another embodiment, terminal modules 111 and 112 are both involves in an ongoing voice telephone call, and party count 253 has a value of "2". When the multi-party module 150 then receives a call signal 693 from the call network 190 indicating the disconnecting of the ongoing voice telephone call, the multi-party module 150 sets party count 253 to "0". The multi-party module 150 may then compose a terminal signal 617 indicating the disconnection of the ongoing voice telephone call, and sends terminal signal 617 to terminal modules 111 and 112.

Figure 7:
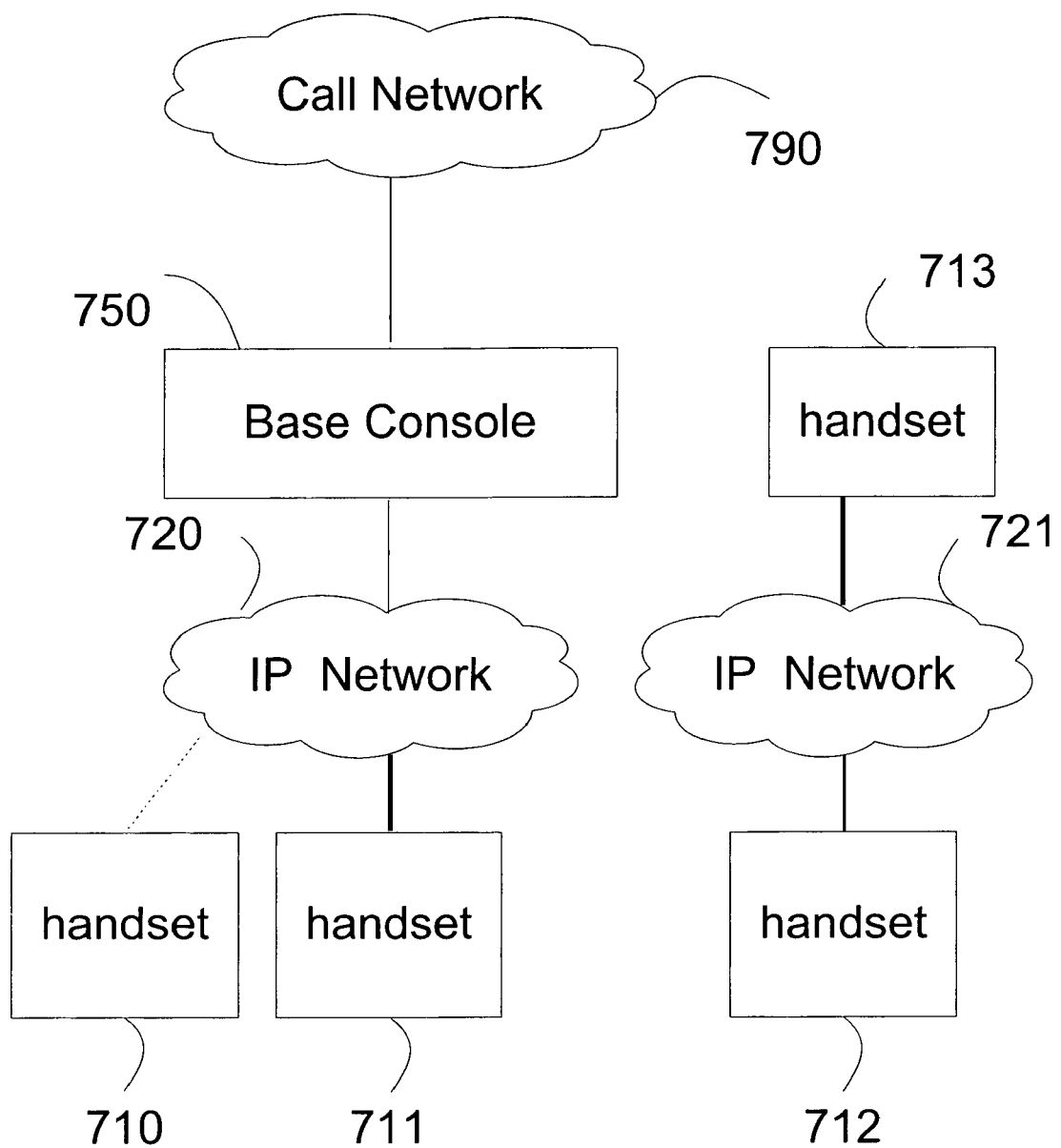
FIG. 7 is a schematic diagram illustrating a multi-handset system that allows multiple handsets to participate in a voice call provided by a public voice communication service, in accordance with an embodiment of the invention.

FIG. 7 is a schematic diagram illustrating a multi-handset system that allows multiple handsets to participate in a voice call provided by a public voice communication service. In an embodiment of the invention, a multi-handset system allows multiple handsets to participate in a voice telephone call provided by a public voice communication service. For example, a multi-handset system may include a base console 750, which includes a multi-party module. The base console connects to a plurality of handsets 710, 711, 712, and a handset may include a terminal module.

Further, the base console of a multi-handset system may connect to a call network 790 to receive a voice communication service. A multi-handset system may be used in a home, and the voice communication service is a residential telephone service. Alternatively, the multi-handset system is used in a small business environment, and the voice communication service is a business telephone service or a collaboration service that includes voice communication.

A base console 750 may connect to a cellular base station, such as a Global System for Mobile Communications ("GSM") base station or a Code Division Multiple Access ("CDMA") base station, and the base console can receive cellular telephone service over the base station. Alternatively, the base console of a multi-handset system can connect to a broadband gateway, and the base console may receive an IP-based voice communication service over the broadband gateway. Examples of the IP-based voice communication service are a Voice Over IP ("VoIP") service such as Vonage™, or Skype™, an IP centrex service, or a service based on Peer-to-Peer Instance Messaging ("IM") based technology, such as Yahoo Messenger™, MSN Messenger™, or GoogleTalk™.

Base console 750 may communicate with a plurality of handsets 710, 711, 712, 713 by sending terminal signals to and receiving terminal signals from the plurality of handsets 710, 711, 712, 713, allowing the plurality of handsets to participate in a voice telephone call.

In an embodiment, IP network 720 and IP network 721 may be the same home network, base console 750 is in the kitchen, handset 710 is in the living room; handset 711 is in the bedroom, and handset 712 is in the family room. In another embodiment, handset 713 attaches directly to base console 750 via a data interface, such as Universal Serial Bus (USB) or Bluetooth interface.

In another embodiment, IP network 720 is a home network and IP network 721 is a corporate IP network, such as a corporate VPN. IP network 720 and IP network 721 may be connected over the Internet. Base console 750, handset 710 and handset 711 may be in the home, handset 712 may be in an office. Handsets 710, 711, 712 and 713 can participate in a voice call between base console 750 and the public voice communication service.

In yet another embodiment, IP network 720 is an office IP network in a corporate headquarters and IP network 721 is an office IP network in a branch office. IP network 720 and IP network 721 may be are connected over the Internet or a corporate VPN. Base Console 750, handset 710 and handset 711 may be in the corporate head quarter and handset 712 may be in the branch office. Handset 710, 711, 712 and 713 can participate in a voice call between base console 750 and the public voice communication service.

A multi-handset may be used in a small business, such as a restaurant, a travel agency or a small retail store.

Figure 8:
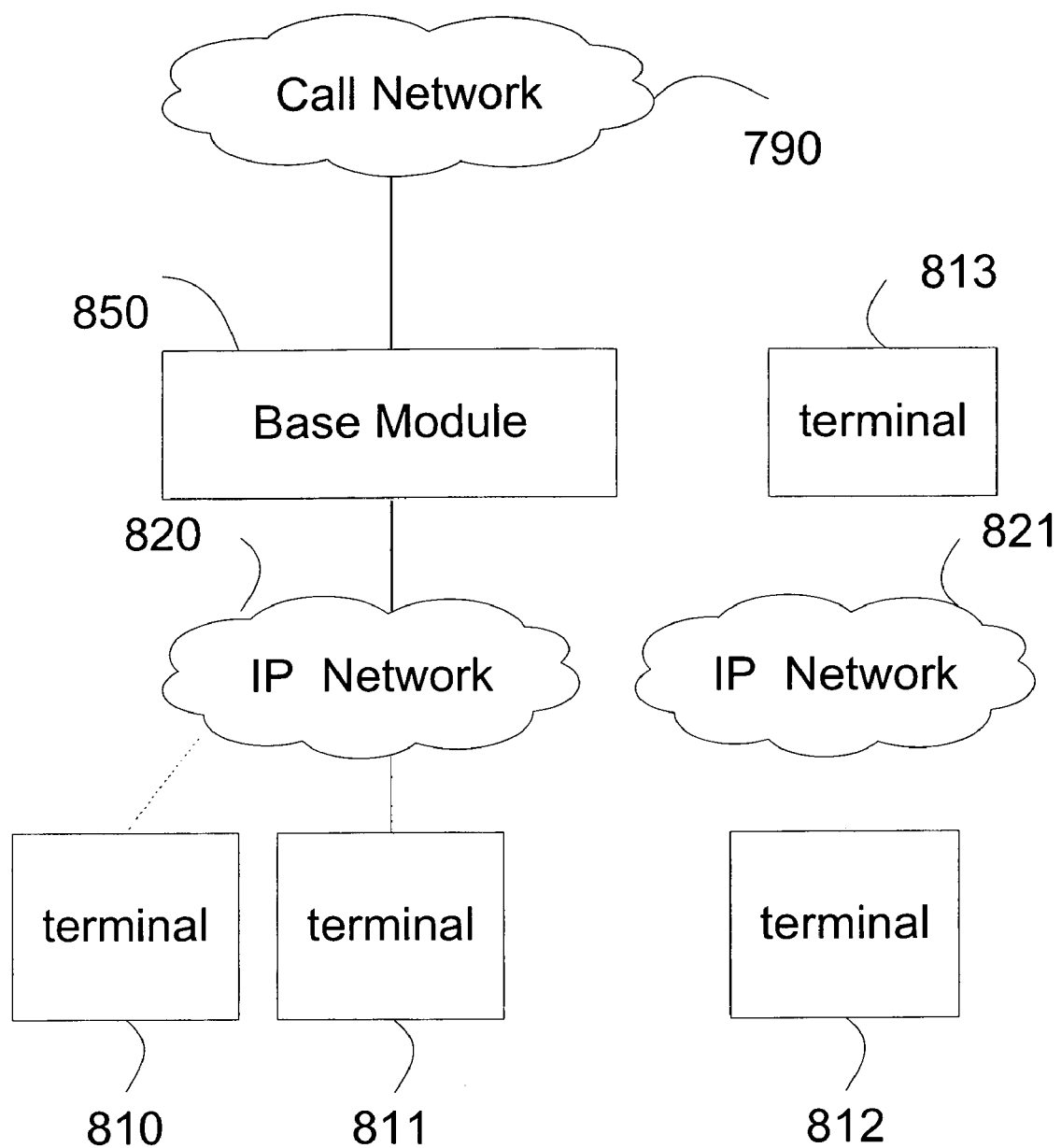
FIG. 8 is a schematic diagram illustrating a multi-terminal system that allows multiple terminals to participate in a voice call provided by a private voice communication service, in accordance with an embodiment of the invention.

FIG. 8 is a schematic diagram illustrating a multi-terminal system that allows multiple terminals to participate in a voice call provided by a private voice communication service.

A multi-terminal system allows multiple terminals to participate in a voice telephone call provided by a private voice communication service. A multi-terminal system can include a base module.

A base module 850 of a multi-terminal system preferably includes a multi-party module, and connects to a plurality of terminals 810, 811, 812, 813. Further, the base console of a multi-terminal system may connect to a call network 790 to receive a voice communication service.

In at least one embodiment a base module receives private voice communication service from a Public Branch Exchange ("PBX"), an IP-PBX, a key system, or a corporate collaboration service based on IM technologies.

In an embodiment, multiple terminals 810, 811, 812, 813 may connect to the base module 850 over an IP network to participate in a voice telephone call between base module 850 and a private voice communication service. For example, base module 850 may communicate with the terminals 810, 811, 812, 813 by sending terminal signals to and receiving terminal signals from the terminals 810, 811, 812, 813 over an IP network, allowing the terminals 810, 811, 812, 813 to participate in a voice telephone call.

In an embodiment, IP network 820 and IP network 821 may be the same network inside a hotel room. Base module 850 may be located at a night stand next to a bed, terminal 810 may be located in the living room next to a television, terminal 811 may be located in the bathroom, terminal 812 may be located on a desk, and terminal 813 may attach directly to base module 850 via a data interface, such as a Universal Serial Bus ("USB") or Bluetooth™ interface. Terminals 810, 811, 812, 813 can participate in a voice telephone call between base module 850 and a private communication service.

Alternatively, IP network 820 may be an office network in a corporate headquarters, and IP network 821 may be an office network in a branch office. IP network 820 and IP network 821 may be connected over the Internet or a corporate VPN. Base module 850, terminal 810 and terminal 811 may be in the corporate headquarters and terminal 812 may be in the branch office. The terminals 810, 811, 812, 813 can participate in a voice telephone call between base module 850 and a private voice communication service.

In another embodiment, IP network 820 may be an office network in an office area, and IP network 821 may be a laboratory network in a laboratory. IP network 820 and IP network 821 may be connected over a corporate IP network. The base module 850, terminal 810 and terminal 811 may be in the office area, and terminals 812 and 813 may be in a laboratory area. Terminals 810, 811, 812 and 813 can participate in a voice call between the base module 850 and a private voice communication service.

In exemplary systems, a multi-terminal system is used in a hotel or motel guest room, an office inside a campus, such as a laboratory, a warehouse, or a guard position, or during an event, for example, in a ticket office, a concession booth, a first aids station.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A multiple party telephone call system in communication with a first Internet Protocol ("IP") data network, comprising:
   a multi-party module in communication with a call interface associated with the first IP data network, and facilitating communications for a plurality of terminal modules that are accessible only via a single multi-party phone line that is separate from the first IP data network, each terminal module associated with a telephonic end-user device; and
   the multi-party module comprising a processor and associated memory, the processor and memory configured to:
      receive an incoming voice telephone call from the call interface, the call interface receiving the incoming voice telephone call over the first IP data network; and
      allow for the plurality of terminal modules within the single multi-party phone line to participate in the voice telephone call simultaneously wherein the multi-party module communicates with one or more additional terminal modules of the plurality of terminal modules over at least one additional IP data network and with at least another terminal module of the plurality of terminal modules over a second IP data network disparate from the first IP data network and the at least one additional IP data network.

2. The system according to claim 1, the processor and associated memory of the multi-party module further configured to increment a counter when a terminal module begins participation in a voice telephone call, and to decrement the counter when a terminal module ends participation in a telephone call.

3. The system according to claim 2, the counter being initialized to zero.

4. The system according to claim 3, the processor and associated memory of the multi-party module further configured to disconnect the voice telephone call when the counter returns to zero.

5. The system according to claim 1, the telephonic end-user device being selected from the group comprising: a telephone handset, a video telephone, a facsimile machine, a Voice over Internet Protocol ("VOIP") telephone, or a softphone.

6. The system according to claim 1, wherein each of the plurality of terminal modules within the single multi-party phone line is operable to transmit a request to the multi-party module to participate in the voice telephone call.

7. The system according to claim 1, wherein each of the terminal modules is operable to receive a request from another terminal module at the multiparty module, the request including an IP address of at least one of the plurality of the terminal modules participating in the ongoing voice telephone call.

8. The system according to claim 1 wherein the multiparty module facilitates communication for the plurality of terminal modules such that all the terminal modules are alerted upon the multiparty module receiving a call signal for the incoming voice telephone call.

9. A method for permitting multiple party telephone calls among terminal modules within a single multi-party phone line wherein the single multi-party phone line is in connection with a first Internet Protocol ("IP") data network and is separate from the first IP data network comprising:
   receiving an incoming voice telephone call at a multi-party module that facilitates communications for the terminal modules that are accessible only via the single multi-party phone line, from a call interface associated with the first IP data network;
   sending a signal from the multi-party module to at least one of the terminal modules, connected to the multiparty module via another IP data network, that there is a call in progress;
   sending a signal from the at least one terminal module to an end user that there is a call in progress;
   sending a signal from the at least one terminal module to the multi-party module; and
   allowing, by the multi-party module, for the at least one terminal module and a second one of the terminal modules within the single multi-party phone line connected to the multi-party module via a second IP network, disparate from the first IP data network and the other IP data network, to participate in the incoming voice telephone call simultaneously such that the at least one and the second terminal modules are allowed to join and participate in an ongoing voice telephone call upon receiving the incoming call, each terminal module associated with a telephonic end-user device.

10. The method according to claim 9, in which the incoming voice telephone call is a VoIP telephone call.

11. The method according to claim 9, in which the incoming voice telephone call is offered by an Instant Messaging ("IM") service.

12. The method according to claim 9, in which the incoming voice telephone call is offered by an Internet Protocol Private Branch Exchange ("IP-PBX").

13. The method according to claim 9, further comprising incrementing counter each time a terminal module begins participation in the call.

14. The method according to claim 13, the counter being initialized to zero.

15. The method according to claim 14, further comprising:
   decrementing the counter each time a terminal module ends participation in the call; and
   terminating the call by the multi-party module when the counter returns to zero.

16. The method according to claim 9, further comprising terminating the incoming voice telephone call by the multi-party module.

17. The method according to claim 9, wherein the multi-party module communicates with one or more of the plurality of terminal modules over one or more additional IP data networks.

18. A method for permitting multiple party telephone calls among a plurality of terminal modules within a single multi-party phone line wherein the single multi-party phone line is in connection with a first Internet Protocol ("IP") data network and is separate from the first IP data network comprising:
   transmitting a signal from one of the terminal modules to a multi-party module facilitating communication for the terminal modules requesting to start a voice telephone call, wherein the plurality of terminal modules are accessible only via the single multi-party phone line;
   composing a signal indicating readiness for initiating an outgoing voice telephone call, and sending the signal to a terminal module connected to multi-party module via another IP data network that is disparate from the first IP data network ;
   receiving from the terminal module connected via the other IP data network at the multi-party module a signal including calling information necessary for establishing the voice telephone call;

composing a call signal for initiation of an outgoing voice telephone call based on the calling information, sending the call signal to the first IP data network to initiate an outgoing voice telephone call by the multi-party module;

sending the outgoing voice telephone call from the multi-party module over the first IP data network; and allowing, by the multi-party module, for at least a second one of the plurality of terminal modules within a single multi-party phone line connected to the multi-party module via a second IP data network, disparate from the first IP data network and the other IP data network, to participate in the outgoing voice telephone call simultaneously such that at least second one of the terminal modules is allowed to join and participate in an ongoing voice telephone call upon reception of the outgoing telephone call by a callee wherein each terminal module is associated with a telephonic end-user device.

19. The method according to claim 18, the telephonic end-user device being a telephone handset.

20. The method according to claim 18, the telephonic end-user device being a video telephone or a facsimile machine.

21. The method according to claim 18, the voice telephone call being a VOIP telephone call.

22. The method according to claim 18, wherein the multi-party module communicates with one or more of the plurality of terminal modules over one or more additional IP data networks.

* * * * *